United States Patent [19]

Ackermann

[11] Patent Number: 4,650,207

[45] Date of Patent: Mar. 17, 1987

[54] PIN RETAINER ASSEMBLY

[75] Inventor: Stephen J. Ackermann, Circle Pines, Minn.

[73] Assignee: Caterpillar Inc., Peoria, Ill.

[21] Appl. No.: 841,403

[22] Filed: Mar. 19, 1986

[51] Int. Cl.4 .............................................. B60D 1/02
[52] U.S. Cl. ................................ 280/515; 280/478 A; 280/499; 280/507
[58] Field of Search ........... 280/515, 400, 457, 476 R, 280/477, 478 R, 478 A, 488, 499, 498, 482, 507; 403/100, 101, 326, 327, 330; 292/59, 60, 67, 68

[56] References Cited

U.S. PATENT DOCUMENTS

| | | | |
|---|---|---|---|
| 2,512,836 | 6/1950 | Olson et al. | 280/482 |
| 2,522,215 | 9/1950 | Du Shane | 280/515 |
| 2,622,890 | 12/1952 | Moses | 280/499 |
| 2,627,423 | 2/1953 | Copeman | 280/515 |
| 2,654,613 | 10/1953 | Blair et al. | 280/515 |
| 2,697,618 | 12/1954 | Hulstedt | 280/515 |
| 2,845,281 | 7/1958 | Holder et al. | 280/478 R |
| 3,011,801 | 12/1961 | Neumann | 280/515 |
| 3,093,395 | 6/1963 | Boutwell | 280/478 A |
| 3,487,448 | 12/1969 | Stemmermann | 280/499 |
| 3,677,565 | 7/1972 | Slosiarek | 280/499 |
| 3,685,864 | 8/1972 | Hall | 280/515 |
| 3,794,357 | 2/1974 | Frye | 280/515 |
| 3,926,456 | 12/1975 | Lundebrek | 280/515 |
| 4,134,602 | 1/1979 | Boger | 280/478 A |
| 4,298,212 | 11/1981 | Jamison | 280/515 |
| 4,394,031 | 7/1983 | Barton et al. | 280/515 |
| 4,398,322 | 8/1983 | Ewen | 280/504 |
| 4,483,550 | 11/1984 | Dubbe | 280/515 |

FOREIGN PATENT DOCUMENTS

| | | | |
|---|---|---|---|
| 492300 | 3/1930 | Fed. Rep. of Germany | 280/478 A |
| 1198092 | 12/1959 | France | 280/499 |
| 582640 | 11/1946 | United Kingdom | 280/515 |
| 737232 | 9/1955 | United Kingdom | 280/515 |

Primary Examiner—John J. Love
Assistant Examiner—Everett G. Diederiks
Attorney, Agent, or Firm—Claude F. White

[57] ABSTRACT

A retainer assembly retains a pair of connecting pins in place within a drawbar arrangement. The connecting pins connect various draft implements to the drawbar and hold the drawbar in a preselected angular position. The retainer assembly provides easy connection of the pins to, or removal from, the drawbar while maintaining the pins in a secured working position. The retainer assembly includes a retainer plate which is spring loaded and is easily manipulated from a first position in which the pins are covered and constrained, and a second position in which the pins are vertically unconstrained. Previous pin retainers for drawbar arrangements used various means to lock or retain a pin in a coupled position, including keys, detents, screw threads, etc. Such previous pin retainers were cumbersome and generally required considerable time and effort to unlock and remove the pin. A worker generally needed to use two hands to couple or release the locking pins. The retainer assembly of the present invention is of simple construction and can be placed in a pin retained position and a pin non-retained position by a worker using a single hand.

14 Claims, 4 Drawing Figures

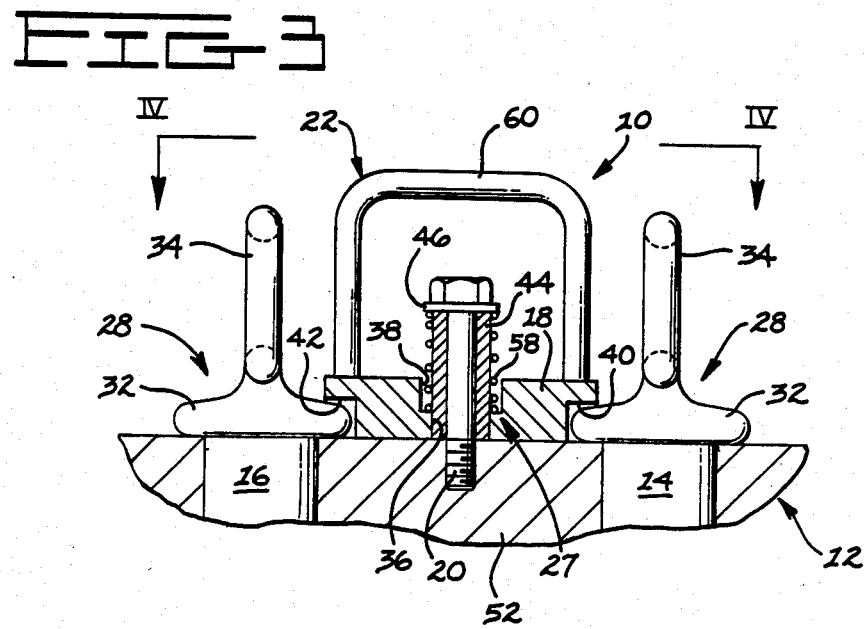
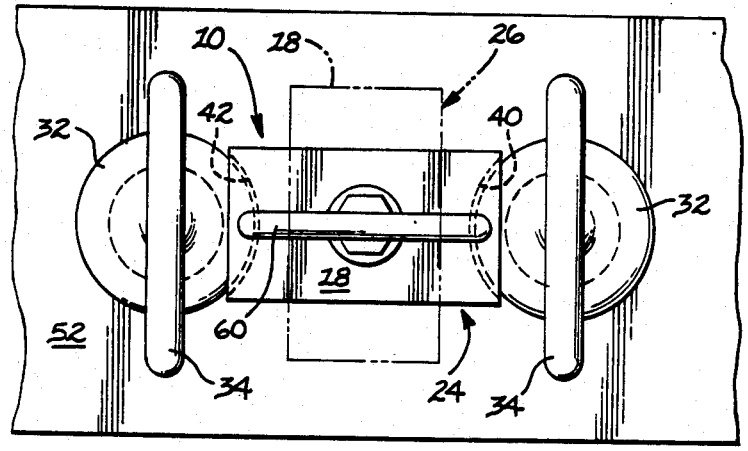

PIN RETAINER ASSEMBLY

TECHNICAL FIELD

This invention relates generally to a retainer assembly for a plurality of connecting pins and more particularly to a retainer assembly which locks the connecting pins in place in a first position of the retainer assembly and unlocks the connecting pins in a second position of the retainer assembly.

BACKGROUND ART

Drawbar assemblies are widely used in construction and farming industries to connect a powered work vehicle to a non-powered draft implement. In most applications, the forward portion of the drawbar assembly is rigidly connected to the rear portion of the vehicle and the draft implement is releasably connected in some manner to the rearward portion of the drawbar. This arrangement provides the flexibility of attaching a variety of draft implements to the work vehicle. In most applications, some type of quick connect device is utilized to join the draft implement to the drawbar assembly. A large number of these connecting devices use cylindrical connecting pins, which penetrate aligned holes in the drawbar and the draft implement, to complete the connection. In order to prevent damage to the draft implement and/or the work vehicle, it is very important to prevent inadvertent removal of the connecting pins. Various locking devices have been used in the past to prevent dislodgement of the connecting pins.

One type of pin locking device is disclosed in U.S. Pat. No. 3,794,357 issued to H. S. Frye on Feb. 26, 1974. In this patent, a hitch and drawbar arrangement are connected by a pin or bolt, and a lock bar prevents the connecting pin from working out of the hitch connection. Although this structure provides adequate locking of the connecting pin in a working position, the structure could not be used to lock a plurality of connecting pins in place.

Other types of pin retainers for hitch and drawbar assemblies are disclosed in U.S. Pat. No. 2,654,613 issued to C. L. Blair et al. on Oct. 6, 1953, and U.S. Pat. No. 4,394,031 issued to R. C. Barton et al. on July 19, 1983. In each of the above-noted patents, a single connecting pin or bolt is retained in a hitch connected position by a spring loaded plate member. The structure disclosed in these two patents would appear to provide sufficient locking of the single pin in each connection, but neither could be used to secure a plurality of connecting pins in a drawbar arrangement.

The present invention is directed to overcoming one or more of the problems as set forth above.

DISCLOSURE OF THE INVENTION

In one aspect of the present invention, a pin retainer assembly for a drawbar apparatus includes a plurality of connecting pins, each having an enlarged head, a retainer plate having a plurality of pin head receiving cavities, and means for securing the retainer plate to the drawbar apparatus. The pin retainer assembly further includes means for pivoting the retainer plate between first and second positions, with the connecting pins being secured by the retainer plate in the first position and the pins being free from securement in the second position. The pin retainer assembly also includes means for biasing the retainer plate toward the drawbar apparatus.

Draft implements are widely used in agricultural and construction industries, and these implements are commonly attached to a vehicle by a drawbar apparatus. Most commonly, a pin or bolt is utilized to make the releasable connection between the vehicle and the draft implement. Various locking devices are used to prevent the pins from becoming dislodged from the connected position. Many of these locking devices are difficult to manipulate and cause undue delay in the connecting and disconnecting process. Additionally, if an adjustable or angling drawbar apparatus is used, two or more connecting pins are generally employed, which complicates the connection and requires even more time to connect and disconnect the draft implement. Many such connections necessitate the use of both hands by the vehicle operator to release and/or remove the pins. This is inefficient since he must then manipulate the drawbar in a separate operation.

The present invention pin retainer assembly enables selected retention and release of multiple connection pins through single-handed manipulation thereof by a worker. The worker can then use his other hand to adjust the drawbar or perform other functions.

BRIEF DESCRIPTION OF THE DRAWINGS

FIG. 3 is a diagrammatic side elevational view, partly in section, of a pin retainer assembly of the present invention taken along lines III—III of FIG. 1; and FIG. 4 is a diagrammatic top plan view taken generally along lines IV—IV of FIG. 3.

BEST MODE FOR CARRYING OUT THE INVENTION

Figure 1:
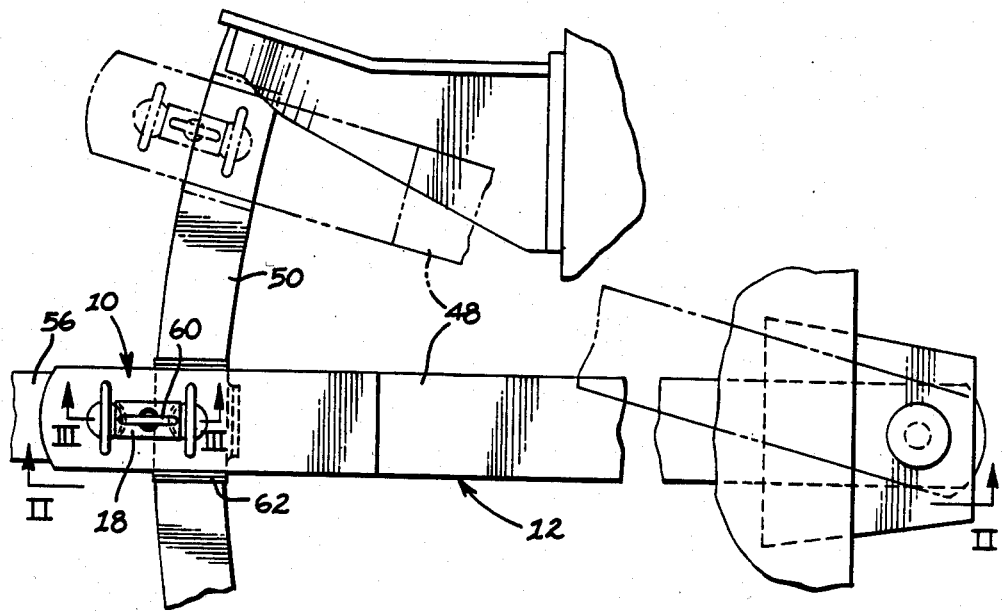
FIG. 1 is a diagrammatic top plan view of a drawbar apparatus and a pin retainer assembly.
Figure 2:
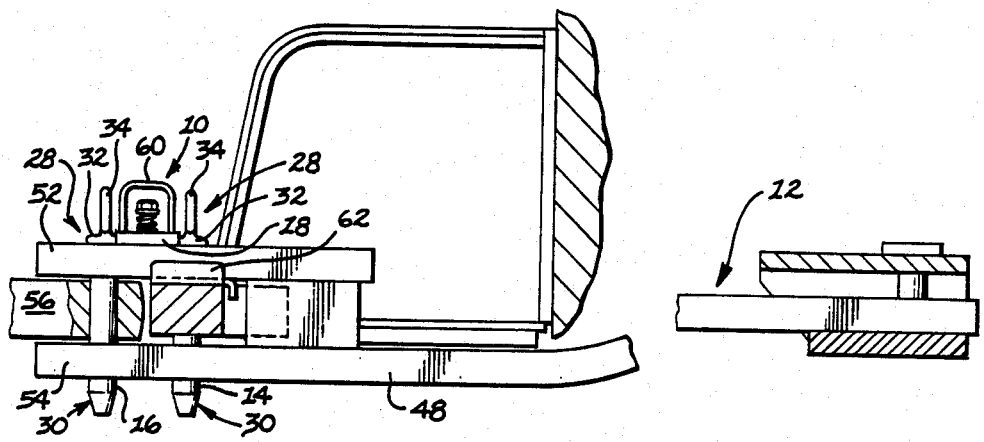
FIG. 2 is a diagrammatic side elevational view of the apparatus of FIG. 1, and taken generally along the lines II—II of FIG. 1.

Referring to the drawings, a connecting pin retainer assembly 10, for a hitch or drawbar apparatus 12, includes first and second elongated hitch connecting pins 14 and 16, a retainer plate 18, a threaded fastener 20 for securing the retainer plate 18 to the drawbar apparatus 12, and means 22 for pivoting and manipulating the retainer plate 18 between a first position 24 and a second position 26, the second position 26 being shown in dotted line detail in FIG. 4. The pin retainer assembly 10 further includes means 27 for biasing the retainer plate 18 into forcible contact with the drawbar apparatus 12. Each of the connecting pins 14,16 has a first end portion 28 and a second end portion 30. The first end portion 28 of each pin 14,16 has an enlarged head 32 and a pin manipulating handle 34 above each head 32.

The retainer plate 18 has a central bore 36, a counterbore 38, and a pair of spaced apart pin head receiving cavities 40,42. The pivoting and manipulating means 22 includes a cylindrical bushing 44 positioned within the central bore 36 and held captive between an enlarged head 46 of the threaded fastener 20 and the drawbar apparatus 12. The drawbar apparatus 12 is preferably an adjustable type and includes a laterally adjustable drawbar 48 and a fixed drawbar support member 50. The drawbar 48 has a pair of vertically spaced upper and lower plates 52,54 which are adapted to receive a tongue or bar 56 of a draft implement (not shown).

The biasing means 27, which in the preferred embodiment is a coil spring 58, is positioned within the counterbore 38 and is compressed and held captive between the head 46 of the fastener 20 and the counterbore 38. The threaded fastener 20 is secured to the upper plate 52 and is positioned within the central bore 36. The first connecting pin 14 is adapted to penetrate the upper plate 52, the lower plate 54, and the support member 50, which is positioned between plates 52 and 54. The second connecting pin 16 is adapted to penetrate the upper plate 52, the lower plate 54, and the draft implement bar 56, which fits between the upper and lower plates 52,54.

The pivoting and manipulating means 22 provides that the retainer plate 18 is positionable between the first position 24 at which a portion of the connecting pins 14,16 are covered and secured by the retainer plate 18, and a second position 26 at which the pins 14,16 are free from the covering and securing relationship of the retainer plate 18. When the retainer plate 18 is in the first position 24, a portion of each pin connecting head 32 is contained within one of the cavities 40,42. The cavities 40,42 have an interior profile which is similar or complementary to the profile of a portion of the heads 32 of the connecting pins 14,16. The pivoting means 22 is positioned laterally substantially mid-way between the pin head receiving cavities 40,42. The pivoting and manipulating means 22 includes a U-shaped handle 60 which is secured to the retainer plate 18. The handle 60 extends over the threaded fastener and is used to move the retainer plate 18 between first and second positions 24,26.

The upper plate 52 of the drawbar 48 is supported by the drawbar support member 50. During lateral adjustment of the drawbar 48 from one position to another, the upper plate 52 slides on the support member 50. Interposed between the upper plate 52 and the support member 50 is a replaceable guide and wear plate 62.

INDUSTRIAL APPLICABILITY

The subject pin retainer assembly is particularly useful with agricultural and construction vehicles which have a drawbar assembly adapted to connect a draft implement to the vehicle. The drawbar 48 is connected to the vehicle (not shown) by a pivot connection and is laterally adjustable along the drawbar support member 50. At the desired position, a connecting pin 14 is inserted through aligned holes in the upper and lower plates 52,54 of the drawbar 48 and through another aligned hole in the drawbar support 50. This secures the drawbar 48 to the drawbar support 50 at a specific lateral position.

A tongue or bar 56 of a draft implement (not shown) is inserted between the upper and lower plates 52,54 and a second connecting pin 16 is inserted through other aligned holes in the plates 52 and 54 and the bar 56. This secures the draft implement to the vehicle. The pin retainer assembly 10 is then pivoted from the second or pin unlocked position 26 to the first or pin locked position 24. To accomplish this, the workman, using a single hand, lifts up on the handle 60 which pulls the retainer plate 18 upward and compresses the spring 58. With the plate 18 in the raised position, the handle 60 and retainer plate 18 are pivoted about the threaded fastener 20 and the bushing 44 to the first position 24. The handle 60 is then released and the plate 18 is forced downward by spring 58 until the plate 18 rests against the upper plate 52. In this position of the plate 18, a portion of heads 32 of the pins 14 and 16 are covered and contained within cavities 40 and 42 and are thereby secured against removal.

With the connecting pins 14,16 so secured by the retainer plate 18, they cannot be accidently removed or jarred loose by operation of the vehicle and draft implement. To disconnect the draft implement, or reposition the drawbar 48 along the support 50, the workman, using a single hand, lifts and rotates the retainer plate 18 to the unlocked position 26 and then removes either pin 14, pin 16, or both. When connecting, or disconnecting the draft implement, a workman can manipulate the bar 56 with one hand and the pins 14,16 and retainer assembly 10 with the other hand. This eliminates the need of more than one workman.

Other aspects, objects, and advantages of this invention can be obtained from a study of the drawings, the disclosure, and the appended claims.

I claim:

1. A retainer assembly for a drawbar apparatus, comprising:
    a plurality of elongated connecting pins, each having first and second end portions, said first end portion of each pin having an enlarged head;
    a retainer plate having a central bore, a counterbore, and a plurality of pin head receiving cavities;
    means for removably connecting said retainer plate to said drawbar apparatus;
    means for pivoting said retainer plate between a first position at which said heads are covered by said retainer plate and a second position at which said heads are free from covering by said retainer plate; and
    means for biasing said retainer plate, toward said drawbar apparatus, said biasing means being receivable within said counterbore.

2. The retainer assembly, as set forth in claim 1, wherein a portion of each connecting pin head is contained within respective ones of said cavities when said retainer plate is in said first position.

3. The retainer assembly, as set forth in claim 1, wherein said pivoting means includes a cylindrical bushing and said bushing is held captive between said connecting means and said drawbar apparatus.

4. The retainer assembly, as set forth in claim 1, wherein said means for removably connecting includes a threaded fastener having screw threads at one end and an enlarged head portion at the opposite end.

5. The retainer assembly, as set forth in claim 1, wherein said pivot means includes a cylindrical bushing.

6. The retainer assembly, as set forth in claim 1, wherein each of said cavities has an interior profile which is complementary to a portion of each of said pin heads.

7. The retainer assembly, as set forth in claim 1, wherein said means for pivoting said retainer plate is positioned laterally substantially mid-way between said pin head receiving cavities.

8. The retainer assembly, as set forth in claim 1, wherein said retainer plate includes a generally U-shaped handle.

9. A connecting pin retaining assembly (10) for a hitch apparatus (12), said hitch apparatus (12) including a laterally adjustable drawbar (48) and a fixed drawbar support member (50), said drawbar (48) having a pair of vertically spaced upper and lower plates (52,54) which are adapted to receive a bar (56) of a draft implement therebetween, said retaining assembly (10) comprising:

first and second hitch connecting pins (14,16), each pin (14,16) having an enlarged head portion (32) and a handle (34) above said head portion (32);

a retainer plate (18) having a central bore (36) and a counterbore (38), and a pair of spaced apart pin head receiving cavities (40,42);

a threaded fastener (20) secured to said upper plate (52) and positioned within said central bore (36);

a cylindrical bushing (44) positioned within said central bore (36) and held captive between said threaded fastener (20) and said upper plate (52);

a coil spring (58) positioned within said counterbore (38) and held captive between said threaded fastener (20) and said retainer plate (18); and means (22) for manipulating said retaining plate (18) from a first position (24) at which said head portions (32) are received in said receiving cavities (40,42) and a second position (26) at which said head portions (32) are free from said receiving cavities (40,42).

10. The retainer assembly, as set forth in claim 9, wherein said manipulating means includes a U-shaped handle secured to said retainer plate.

11. The retainer assembly, as set forth in claim 9, wherein said first hitch connecting pin is adapted to penetrate said upper and lower plates and said support member.

12. The retainer assembly, as set forth in claim 9, wherein said second hitch connecting pin is adapted to penetrate said upper and lower plates and said draft implement bar.

13. The retainer assembly, as set forth in claim 9, wherein said upper plate is supported by said drawbar support member and said upper plate slides on said support member during lateral adjustment of said drawbar.

14. The retainer assembly, as set forth in claim 13, including a wear plate positioned between said upper plate and said support member.

* * * * *